United States Patent [19]

Lehmann

[11] Patent Number: 5,170,660
[45] Date of Patent: Dec. 15, 1992

[54] PROCESS AND APPARATUS FOR VOLUME-TESTING A HOLLOW BODY

[76] Inventor: Martin Lehmann, Obere Farnbühlstrasse 1, 5610 Wohlen, Switzerland

[21] Appl. No.: 551,792

[22] Filed: Jul. 12, 1990

Related U.S. Application Data

[63] Continuation-in-part of Ser. No. 474,164, Feb. 2, 1990, abandoned, which is a continuation of Ser. No. 115,408, Nov. 2, 1987, abandoned.

[51] Int. Cl.[5] .............................................. G01M 3/32
[52] U.S. Cl. ............................................ 73/49.3; 73/52
[58] Field of Search .................. 73/49.2, 49.3, 52, 40, 73/149

[56] References Cited

U.S. PATENT DOCUMENTS

| | | | |
|---|---|---|---|
| 2,784,373 | 3/1957 | Lawrence et al. | 73/49.3 X |
| 4,593,554 | 6/1986 | Aarts | 73/49.3 |
| 4,656,866 | 4/1987 | Aarts | 73/49.3 |
| 4,689,987 | 9/1987 | Aarts | 73/49.3 |
| 4,845,977 | 7/1989 | Aarts | 73/49.3 |
| 4,858,463 | 8/1989 | Rossé et al. | 73/49.3 |

FOREIGN PATENT DOCUMENTS 34337 2/1983 Japan .................................. 73/49.3

Primary Examiner—Hezron E. Williams
Assistant Examiner—Joseph W. Roskos
Attorney, Agent, or Firm—Antonelli, Terry, Stout & Kraus

[57] ABSTRACT

A closed container is placed in a test chamber for the purpose of testing the container's tightness. A prechamber is brought to a desired pressure, then connected with the test chamber. The pressure in the test chamber is stored at a certain point in time on the input side of a differential pressure sensor and then the plot of the test chamber pressure is compared with the reference pressure thus formed. Any pressure compensation which occurs if leaks are present in the hollow body is recorded as an indication of such leakage.

34 Claims, 3 Drawing Sheets

PROCESS AND APPARATUS FOR VOLUME-TESTING A HOLLOW BODY

This is a continuation-in-part of U.S. application Ser. No. 474,164 filed Feb. 2, 1990, now abandoned which is a continuation of U.S. application Ser. No. 115,408 filed Nov. 2, 1987, now abandoned. The subject matter disclosed in U.S. application Ser. No. 474,164 and U.S. application Ser. No. 115,408 is incorporated herein by reference.

This application is also related to U.S. application Ser. No. 693,586 filed Apr. 3, 1991 which is a continuation-in-part of U.S. application Ser. No. 599,424 filed Oct. 18, 1990 now U.S. Pat. No. 5,029,464 which is a continuation of U.S. application Ser. No. 474,164 filed Feb. 2, 1990 now abandoned.

TECHNICAL FIELD

The present invention relates to a process and apparatus for volume-testing a hollow body. In particular, the apparatus relates to the testing of flexible hollow bodies.

BACKGROUND OF INVENTION

The present invention concerns a method and apparatus for testing for the volume of a hollow body, for testing the tightness of a hollow body and for detecting a change in volume caused by pressure stress applied to walls of the hollow body, namely, for example, testing flexible hollow bodies such as coffee packages.

In the packaging of certain foodstuffs, such as sweeteners and coffee or medications such as effervescent tablets, it is essential that packaging containers are sealed tightly against the environment in order to prevent the packaged goods from becoming contaminated, for example, by atmospheric humidity. The goods are sometimes packed in containers such as bottles, cans or pouches. These containers are generally dimensionally stable or flexible hollow bodies which are fitted with lids or closable sections which can be opened, but which in the closed state are intended to tightly seal the interior of the hollow body.

Various procedures, for example, welding, are used in the manufacture of such containers. In addition to the tightness of such hollow bodies, also the rigidity of the walls of dimensionally stable containers, especially in the area of junction points, is an essential criterion determining their usability. Excessively rigid or excessively weak sections, such as weld seams may result in cracks forming when the container is in use, for example, in areas where parts of different rigidity are joined.

DESCRIPTION OF INVENTION

It is an object of the present invention to create a simple and quick test procedure for the volume of hollow bodies as well as a corresponding arrangement by means of which such hollow bodies can be tested in a simple and extremely reliable manner.

In particular, the present invention proposes a method wherein the hollow body is placed in a test chamber and is subjected to a positive or negative pressure difference between the internal pressure of the hollow body and the pressure in the test chamber, and wherein conclusions be drawn regarding the tightness of the hollow body or its change in volume from the behavior of the pressure in the test chamber.

When a hollow body, which is optionally and preferably filled, is introduced into a test chamber and the chamber is filled with a test gas, preferably air, having a positive or negative differential pressure relative to the internal pressure of the hollow body, a pressure equalization will take place between the test chamber pressure and the internal pressure of the hollow body depending on the tightness or leakage of the hollow body. The rate at which this equalization process takes place is a measure of the magnitude of any leakage that is present. Similarly, any increase or decrease in the volume of the hollow body will exert an effect which is a measure of the elasticity of the walls of the hollow body. The volume will increase when the pressure difference is directed outwards from the hollow body.

According to one embodiment of the present invention, the pressure is in an initial variant of the procedure it is proposed that the pressure in the test chamber is preferably constantly regulated according to a given time sequence and a controlled variable used is evaluated. If a leak exists in the hollow body undergoing testing, then in order to maintain a constant pressure in the test chamber a certain amount of pressure medium as controlled variable must be added to or removed from the chamber per unit time. This amount corresponds to the per unit time amount of pressure medium flowing from the chamber into the interior of the hollow body or vice versa. The amount of pressure medium per unit time which has to be supplied to or, when the pressure difference is directed outwards from the interior of the hollow body, must be removed from the test chamber is preferentially evaluated as a measured variable.

To apply a predetermined pressure, practically as the initial pressure to the test chamber and after sealing off the pressurized chamber containing the hollow body, to derive the above-mentioned criteria from the pressure curve, the second chamber may be pressurized to a given pressure and joined to the test chamber in order to produce the differential pressure. The pressure in the test chamber, once the two chambers are joined, is derived from the pressure level set in the further chamber and the volume ration of the two chambers. In order to increase a measurement signal, the test chamber should preferentially be pre-pressurized with a positive or negative pressure relative to atmospheric pressure.

Further, to create a defined reference pressure for the purpose of evaluating the internal pressure of the test chamber and in order to be able to perform the evaluation on the basis of a differential pressure measurement, the chamber is connected with a reference pressure system prior to evaluation. Then the reference pressure system is disconnected from the chamber and its pressure is set as the reference pressure for the subsequent evaluation of the chamber pressure.

Because the reference pressure system is first joined to the chamber the pressure which adjusts within it is the same as the pressure in the test chamber. If the reference pressure system is then disconnected from the chamber the pressure value then prevailing in the test chamber is stored in the reference pressure system and is used in the subsequent evaluation procedure as the reference pressure for a differential pressure measurement.

Furthermore, by carrying out the evaluation of the chamber pressure at a particular point in time the process of evaluation becomes extremely simple. At a given point in time a check is carried out to ascertain whether the ACTUAL chamber pressure corresponds to the DESIRED chamber pressure which has been selected in advance, for example, for tight hollow bodies. If the ACTUAL test chamber pressure is compared at two or more points in time, or even continuously in time, with DESIRED pressure values for two or more points in time or with a DESIRED pressure-time curve, then especially in the case of very small leaks, the resolving power of the evaluating process is increased, by integrating the comparative result or the DESIRED-ACTUAL difference.

In addition, preselected DESIRED pressure values or DESIRED pressure curves should preferentially be stored and, when carrying out the test mentioned above, they should be compared as comparative values with the recorded ACTUAL values in order to determine whether a hollow body should, for example, be rejected because of excessive leakage or because it has excessively stiff or excessively elastic wall sections.

An apparatus for performing the method according to the present invention comprises:
at least one tightly sealable test chamber to receive at least one hollow body,
regulatable pressure-generating devices to apply pressure to the test chamber,
pressure-recording devices connectable to the test chamber and having at least one signal output which is dependent on the test chamber pressure.

The method of the present invention comprises the steps of:
loading a predetermined volume with a predetermined pressure of a gas,
connecting the predetermined volume loaded with a predetermined pressure to a volume dependant of a volume of the body, to form a composite volume,
measuring a pressure resulting in the composite volume as a measure of the volume of the body to test the body whether it accords with a rated volume for the body or not.

BRIEF DESCRIPTION OF THE DRAWINGS

The invention will be explained in connection with the accompanying drawings which show, for the purposes of illustration only, several examples in accordance with the present invention.

DETAILED DESCRIPTION

Figure 1:
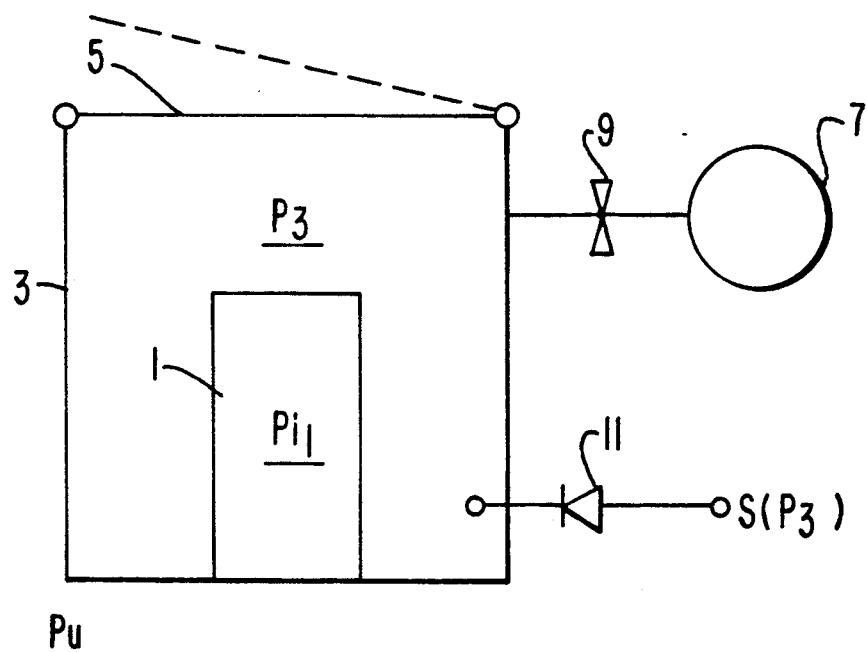
FIG. 1 is a functional block diagram of the fundamental structure of an apparatus according to the present invention and operating according to the method of the present invention.

FIG. 1 is a schematic block diagram of the method according to the present invention or of an apparatus for implementing the method. A hollow body 1 is to be tested to determine whether its volume under pressure stress accords to a predetermined behavior. The hollow body 1 is placed in a test chamber 3 or through an opening which is tightly closable by means of a lid 5. An internal pressure $p_{il}$, which normally corresponds to the ambient pressure $p_{ul}$ exists in the interior of the hollow body 1. Once the test chamber 3 has been hermetically sealed it is pressurized by connecting a source of pressure medium 7 to the test chamber 3. The pressure medium used is a gas, preferentially air. As a result, a positive or negative differential pressure is generated inside the test chamber 3 with reference to the internal pressure $p_{il}$ inside the hollow body 1.

The pressure inside the test chamber 3 is designated $p_3$ in FIG. 1. Then the pressure system, consisting of test chamber 3 and the hollow body 1 to be tested, is separated from the source of pressure medium 7 by means of, for example, a shut-off valve 9 and allowed to stand by itself. If the hollow body 1 is tight to the gas used and if its walls are so rigid that the forces resulting from the pressure difference between $p_3$ and $p_{il}$ acting on the walls do not bring about any substantial deformations, then using a pressure sensor, which could be a mechanical/electrical converter, e.g., a piezo-electric pressure sensor, as shown in diagrammatic form at 11 in FIG. 1, an output signal $s(p_3)$ is recorded as qualitatively depicted in FIG. 2a at $p_3(a)$.

Thereby, it must be stated that the volume wherein $p_3$ prevails, such as the volume difference of volume of chamber 3 and of container 1, is a volume dependent from the volume of the body 1 to be tested.

Figure 2A:
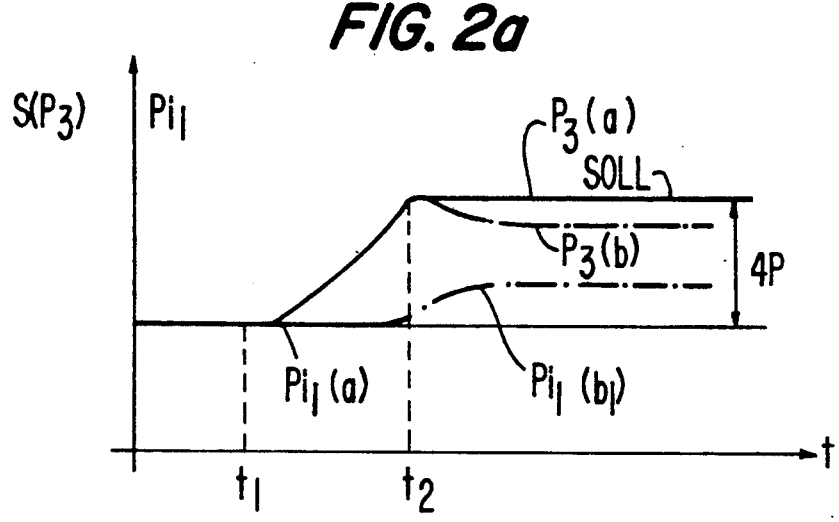
FIG. 2a shows the qualitative plot of the internal pressure in the hollow body and the internal pressure in the test chamber over time, given a differential pressure between test chamber and interior of the hollow body which is directed towards the interior of the hollow body, and given fully rigid and airtight walls of the hollow body on the one hand, and given walls which are airtight but yield under the applied pressure stresses.

FIG. 2a presents a qualitative plot over time t of the pressure in the test chamber 3 corresponding to the signal $s(p_3)$, and also of the internal pressure $p_{il}$ in the hollow body 1. Up to time $t_1$, i.e. until the hollow body 1 is introduced into the test chamber 3 and the latter is tightly closed by means of cover 5, $p_3$ and $p_{il}$ are identical to the ambient pressure $p_u$. At time $t_1$ the process of pressurizing the test chamber by means of pressure medium source 7 commences and the pressure in the chamber 3 rises. In the case mentioned above, in which the hollow body has rigid and tight walls, the internal pressure $p_{il}$ remains unaffected by the change in pressure in test chamber 3. At time $t_2$ the source 7 is separated from the test chamber 3 and in the present case the test chamber pressure $p_3(a)$ remains at least approximately constant as does also the internal pressure $p_{il}(a)$ in the hollow body 1.

If the walls of the hollow body 1 are not absolutely rigid in the above-mentioned sense but undergo deflection inwards or outwards at least at certain points and in accordance with the applied pressure difference $\Delta p$, which may be positive or negative, then when the differential pressure is directed towards the interior of the hollow body the qualitative curves $p_3$ (b) or $p_{il}(b)$ indicated by the dash-dot lines are obtained. Similar circumstances prevail when the differential pressure is directed towards the test chamber 3.

As can be seen from these qualitative curves, after a short or long period of time both pressures tend asymptotically towards a different, constant limit value.

As was mentioned above, the volume wherein $p_3$ pertains is dependent from the volume of the body 1 to be tested. Thus, the time behavior of pressure $p_3$ is indicative of the volume behavior of the body 1. At a positive pressure difference $\Delta p$ as shown in FIG. 2a the difference of $p_3(b)$ with respect to $p_3(a)$ is significant of the amount of volume of body 1 which is compressed under pressure stress according to $\Delta p$.

It is evident that instead of pressurizing the test chamber 3 with respect to ambient pressure $p_{il}(a)$ as initial valve in body 1, it is also possible to pressurize the interior of body 1 with respect to its external, preferably ambient pressure and to monitor the internal pressure $p_{il}$ of the body 1. Due to a pressure difference stress thus applied to the body internal pressure with respect to external pressure which might be positive or negative, the time behavior of the internal pressure $p_{il}$ will then be, in analogy to the time behavior of the external pressure $p_3$ according to FIG. 2a, an indication of volume behavior of the body 1 and thus the test value for volume testing of that body. This volume behavior testing technique, especially with respect to external ambient pressure, thus without need of a test chamber, is highly suitable for inline testing of plastic material bodies, such as of plastic bottles in fast production lines.

Figure 2B:
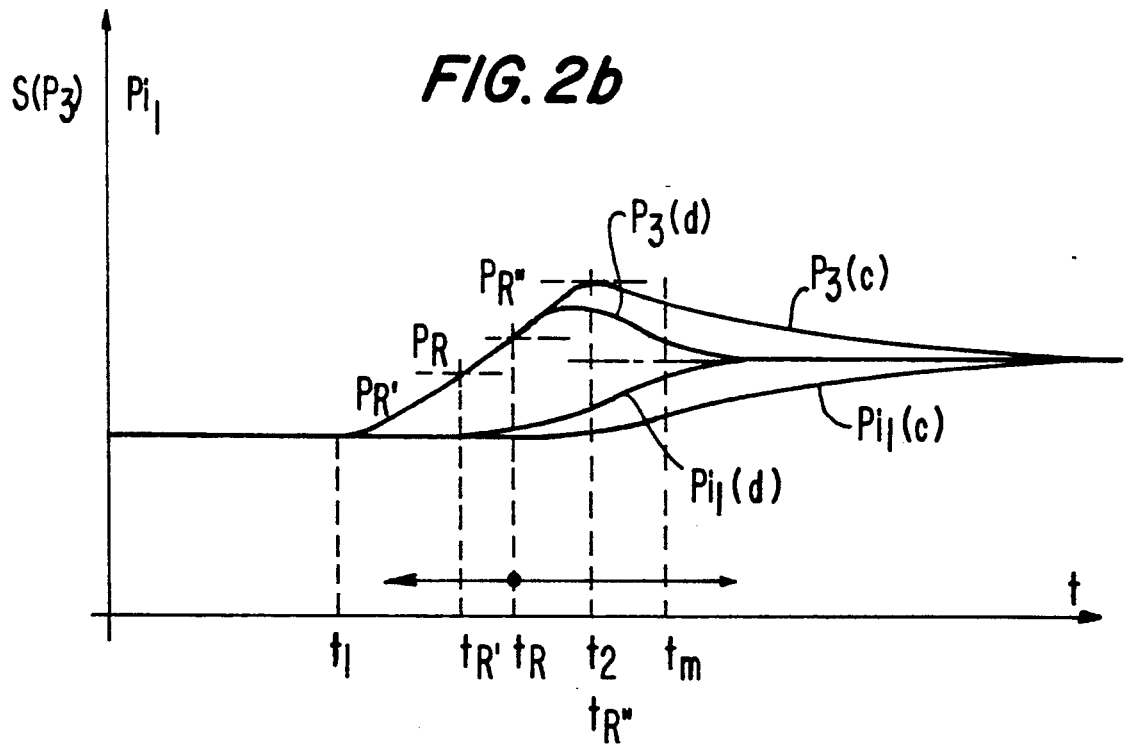
FIG. 2b is a qualitative plot according to FIG. 2a given different leakage rates of the hollow body.

FIG. 2b is a plot, similar to that shown in FIG. 2a, of the conditions prevailing when leaks of various size exist in the hollow body 1. Given a relatively small leak rate, the internal pressure of the hollow body 1 and the pressure between test chamber 3 and the hollow body 1 equalize at a relatively slow rate in accordance with the qualitative curves p(c), while for larger leaks the equalization takes place at an increasingly fast rate, as shown for example by the curves p(d). If a DESIRED curve $p_3$, such as shown by $p_3(b)$, is known to apply in general to intact, airtight hollow bodies 1, into account any change in volume in the hollow body 1 caused by the differential pressure stress, then on the output side of the sensor 11 it is possible to judge, by comparing the ACTUAL curve with the DESIRED curve, to what extent a tested hollow body is airtight or not or whether it should be rejected or not. Thus measuring of time course of the external pressure of body 1 with test chamber and analogically of the interior pressure of body 1 without test chamber and then relative to surrounding ambient pressure will reveal leakage conditions and volume conditions of the body.

Figure 3:
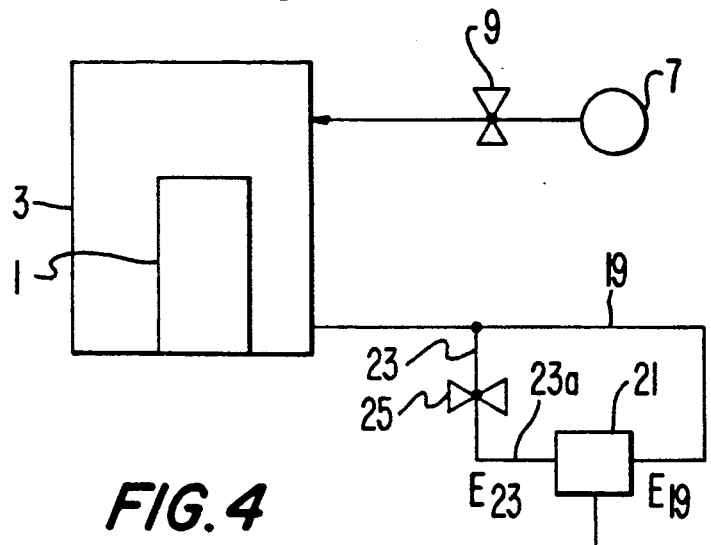
FIG. 3 shows, on the basis of the depiction in FIG. 1, a preferred embodiment of the pressure-recording system in which the pressure is measured as a differential pressure.

In accordance with FIG. 1 for external pressure measurement, that pressure $p_3$ is measured for example with reference to the ambient atmosphere having pressure $p_u$, and advantageously, and as will be described further below, the difference between pressure $p_3$ and a given reference pressure is measured. As shown in FIG. 3, the pressure in the test chamber 3 is held constant and the amount of pressure medium or gas added to or removed from the test chamber 3 per unit time, or integrated over a given period of time, is recorded as the measured variable, be it for volume testing or for leakage testing.

FIG. 3 shows a preferred embodiment of the method of measuring the pressure in test chamber 3 as depicted in FIG. 1. During the pressure build-up phase between times $t_1$ and $t_2$ the test chamber 3 is connected via a line 19 with an input $E_{19}$ of a differential pressure sensor 21, such as a piezo-electric sensor. Via a second line 23 fitted with a shut-off valve 25, the test chamber 3 is further connected with the second input $E_{23}$ of the differential pressure sensor 21. At time $t_R$ as shown in FIG. 2 the shut-off valve 25 is closed so that the pressure prevailing at that time in the test chamber 3 remains built-up in the section of line 23a between shut-off valve 25 and input $E_{23}$ which is used as the reference pressure system. This pressure in the connecting line 23a acts as the reference pressure on differential pressure sensor 21 and since the line 19 remains open in the following measurement phase for $t > t_2$, a differential pressure is measured at differential pressure sensor 21 relative to the pressure prevailing in the test chamber at time $t_R$. As can be seen from FIG. 2, the time $t_R$ is adjusted on a case by case basis to give optimum measurement results, as indicated by $t_{R'}$, $t_{R''}$ and the resulting reference pressures $p_R$, $p_{R'}$, $p_{R''}$.

Figure 4:
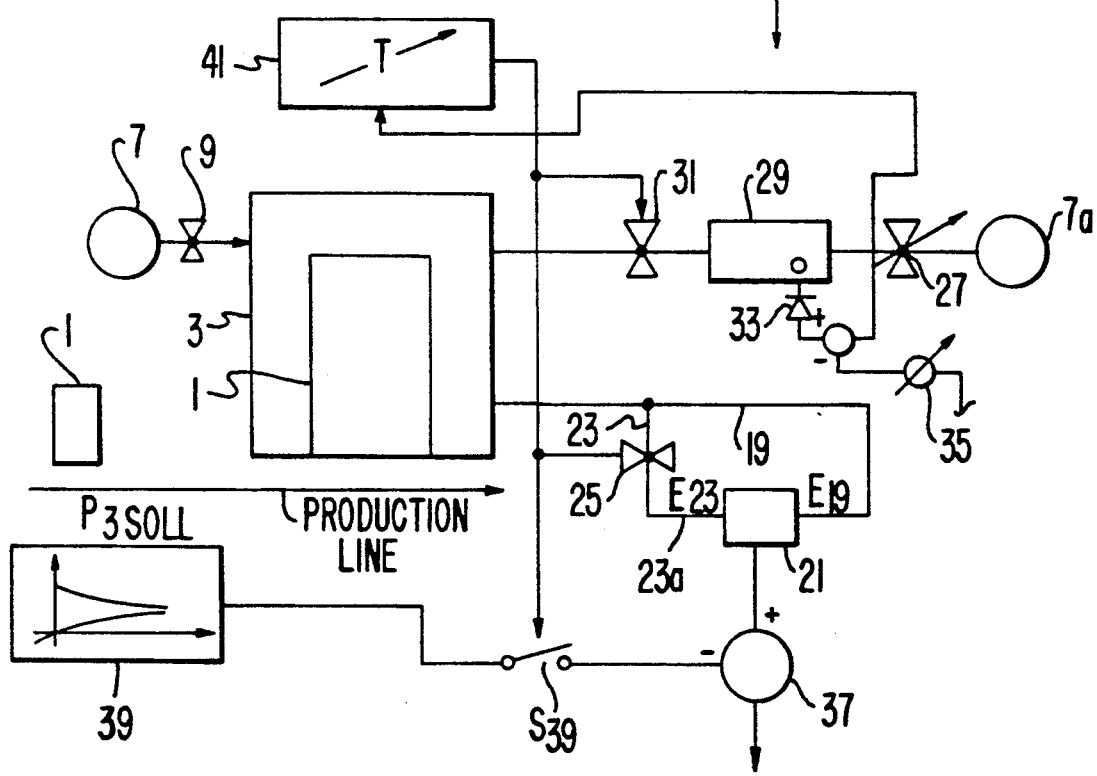
FIG. 4 shows, on the basis of the depiction in FIG. 1 or FIG. 3, a preferred embodiment of the apparatus for applying pressure to the test chamber as well as a further time control apparatus for controlling the time of the individual phases of the procedure.

FIG. 4 presents a preferred embodiment of the means of pressurizing test chamber 3, whereby information of the volume of body 1 is derived. For this purpose a test gas source, such as a pump 7a, is connected via a shut-off valve 27 with a reference volume in a reference chamber 29. The latter is connected via a further shut-off valve 31 with the test chamber 3 Using source $7_a$ and with valve 27 initially open and a valve 31 shut-off, the reference chamber 29 is filled with test gas and a pressure sensor 33 is used to measure the pressure in the reference chamber. Once the pressure measured by sensor 33 attains the reference pressure adjusted at a reference signal source 35 then valve 27 is closed. Next, valve 31 is opened, thus forming a communicating system between chambers 3 and 29 and the test gas pressure is equalized according to the volumes in chambers 29 and 3. Following an equalization phase corresponding to the time section $t_2$' $t_1$ in FIG. 2b, the plot of the differential pressure is measured using the differential pressure sensor 21, as described on the basis of FIG. 3, or at a given measuring time $t_m$ any differences between a DESIRED differential pressure and an ACTUAL differential pressure are recorded as shown in FIG. 2b.

As further shown in FIG. 4, the output of the differential pressure sensor 21 is fed, for example, to a comparator 37 to which, at a second input, a standard curve is supplied from a storage and output device 39, such as a computer. The deviations of the test result from a given DESIRED result can be output at any point in time at the output of the comparator 37, and on the basis of these deviations a decision can be made regarding the condition of the hollow body 1 that is being tested. Instead of comparing the time curves, it is possible at any given point in time corresponding to $t_m$ to compare the ACTUAL pressure difference at the output of the differential pressure sensor 21 with DESIRED values stored in unit 39. For this purpose a timer unit, as shown in diagrammatic form at 41, is provided. When the given pressure is attained in the reference chamber 29 the timer is activated and, in accordance with preselected time intervals T, it operates the valves 31 and 25 and can also set the DESIRED value at $S_{39}$.

According to this method and using the apparatus described, it is possible to detect leaks and volume reliably and rapidly over an extremely broad range. Similarly, as was explained on the basis of FIG. 2a, it is possible to detect deviations in the shape characteristics of the hollow body from the anticipated shape characteristics, as may happen for example if the wall sections are unacceptably rigid or unacceptably elastic.

With respect to volume testing, it was explained that, in FIG. 2a, the time behavior of the external pressure $p_3$ of body 1, which is measured according to FIG. 4 by means of sensor 21, is indicative for the under-stress volume behavior of the body 1, and that this is also valid if the internal pressure is taken as volume-indicative measuring or testing value. In the latter case, obviously a sensor should sealingly be connected to the interior of body 1.

Taking into account that according to FIG. 4 the reference chamber 29 represents a given, known volume and this given volume is first loaded to a predetermined or known pressure, then, by opening valve 31, the gas in chamber 29 is expanded into a volume dependent from the volume of body 1 namely into the remaining volume of chamber 3, the resulting pressure in combined chambers 3 and 29 will, as was mentioned above, depend from the ratio of these two volumes. As the volume in chamber 3 is dependent from the volume of body 1, thus the resulting pressure in combined chambers 3, 29 and according to $p_3$ of FIG. 2a is indicative of the volume of body 1. Thus evaluating with sensor 21 of FIG. 4 pressure $p_3$ with respect to a reference pressure at $E_{23}$ set, e.g., before opening valve 31 will give an indication for the volume of body 1. Thus comparison of this pressure $p_3$ according to FIG. 2a with a reference value leads to the information whether a body 1 under test has a rated volume or not.

As was mentioned above, this volume measurement may analogically be realized by measuring inside pressure $p_{il}$ of the body 1, thereby connecting, by means of valve 31, reference chamber 29 sealingly to the inside of the body 1. In the latter case volume testing is done without test chamber 3.

I claim:

1. A method for testing a hollow body, comprising the steps of:
    loading a predetermined reference volume with a predetermined pressure of a gas;
    connecting said predetermined reference volume loaded with said predetermined pressure to a volume of said hollow body to form a composite volume; and
    measuring a pressure resulting in said composite volume as a measure of said volume of said hollow body.

2. The method of claim 1, wherein said predetermined reference volume is sealingly connected to the inside of said hollow body.

3. The method of claim 1, wherein said predetermined reference volume is connected to a test chamber in which said hollow body is located.

4. The method according to claim 1, wherein a pressure in said volume of said hollow body is at ambient pressure before connection to said predetermined reference volume.

5. The method according to claim 1, wherein said pressure resulting in said composite volume is evaluated at a given point in time, or at two or more points in time, or continuously over a period of time.

6. The method according to claim 5, wherein said pressure resulting in said composite volume or a differential pressure between said resulting pressure and a reference pressure is compared at one or more points in time to a preferentially stored pressure or pressure difference values, and based on said comparison a conclusion is drawn about whether to reject the hollow body.

7. The method according to claim 1, wherein said hollow body is a flexible hollow body.

8. The method according to claim 1, wherein said hollow body is at least partially filled.

9. The method according to claim 1 further comprising the step of:
    determining whether said measured volume of hollow body corresponds with a rated volume for said hollow body.

10. Apparatus for volume-testing a hollow body, comprising:
    a chamber of a predetermined reference volume;
    means for loading said chamber with a predetermined pressure of gas;
    connecting means for connecting said chamber having said predetermined reference volume to a volume of said hollow body; and
    pressure measuring means connected to one of said chamber and said volume of said hollow body for measuring a resulting pressure within said chamber and said volume of said hollow body as a measurement of said volume of said hollow body.

11. Apparatus according to claim 7, further comprising:
    means for sealingly connecting said chamber to the interior of said hollow body.

12. Apparatus according to claim 10, wherein said pressure measuring means comprises:
    at least one differential pressure sensor having a first input directly linked to one of said chamber and said volume of said hollow body and a second input connected to said one of said chamber and said volume of said hollow body via a shut-off device.

13. Apparatus according to claim 12, further comprising:
    a control unit for controlling said shut-off device to cause said shut-off device to close once a given pressure is reached in one of said chamber and said volume of said hollow body, thereby storing a reference pressure at said differential pressure sensor, and for controlling said connecting means.

14. Apparatus according to claim 10, further comprising:
    means for storing data including at least one desired pressure or at least one desired pressure course;
    wherein said pressure measuring means and said storing means are connected to a comparator device for comparing the behavior of said resulting pressure measured by said pressure measuring means to said desired pressure or said desired pressure course stored in said storing means.

15. The apparatus according to claim 10, wherein said hollow body is a flexible hollow body.

16. The apparatus according to claim 10, wherein said hollow body is at least partially filled.

17. Apparatus for volume-testing a hollow body, comprising:
    a first chamber of a predetermined reference volume;
    means for loading said first chamber with a predetermined pressure of gas;
    a second chamber in which said hollow body is disposed, wherein a volume of said second chamber minus a volume of said hollow body forms a dependent volume related to said volume of said hollow body;
    connecting means for connecting said first chamber to said dependent volume;
    pressure measuring means connected to one of said first chamber and said dependent volume for measuring a resulting pressure in said first chamber and said dependent volume as a measure of said volume of said hollow body.

18. Apparatus according to claim 17, wherein said pressure measuring means comprises:

at least one differential pressure sensor having a first input directly linked to one of said first chamber and said dependent volume and a second input connected to the other of said first chamber and said dependent volume via a shut-off device.

19. Apparatus according to claim 18, further comprising:
a control unit for controlling said shut-off device to cause said shut-off device to close once a given pressure is reached in one of said chamber and said dependent volume, thereby storing a reference pressure at said differential pressure sensor, and for controlling said connecting means.

20. Apparatus according to claim 17, further comprising:
means for storing data including at least one desired pressure or at least one desired pressure course;
wherein said pressure measuring means and said storing means are connected to a comparator device for comparing the behavior of said resulting pressure measured by said pressure measuring means to said desired pressure or said desired pressure course stored in said storing means.

21. The apparatus according to claim 17 wherein said hollow body is a flexible hollow body.

22. The apparatus according to claim 17, wherein said hollow body is at least partially filled.

23. The apparatus according to claim 17, further comprising:
means for determining whether said measured volume of said hollow body corresponds to a rated volume for said hollow body.

24. A method for testing a hollow body, comprising the steps of:
loading a predetermined reference volume with a predetermined pressure of a gas;
disposing said hollow body in a predetermined test volume, wherein said predetermined test volume minus a volume of said hollow body forms a dependent volume related to said volume of said hollow body;
connecting said predetermined reference volume loaded with said predetermined pressure to said predetermined test volume to form a composite volume; and
measuring a pressure resulting in said composite volume as a measure of said volume of said hollow body.

25. The method according to claim 24 further comprising the step of:
determining whether said measured volume of hollow body corresponds with a rated volume for said hollow body.

26. The method according to claim 24, wherein a pressure in said dependent volume is at ambient pressure before connection to said predetermined reference volume.

27. The method according to claim 26, wherein said pressure resulting in said composite volume or a differential pressure between said resulting pressure and a reference pressure is compared at one or more points in time to a preferentially stored pressure or pressure difference values, and based on said comparison a conclusion is drawn whether to reject said hollow body.

28. The method according to claim 24, wherein said pressure resulting in said composite volume is evaluated at a given point in time, or at two or more points in time, or continuously over a period of time.

29. The method according to claim 24, wherein said hollow body is a flexible hollow body.

30. The method according to claim 24, wherein said hollow body is at least partially filled.

31. A method for in-line volume testing of plastic bottles in production lines comprising the steps of:
sealingly connected a reference chamber of a predetermined volume to an interior of a plastic bottle to be tested;
closing off said reference chamber from said plastic bottle;
loading said reference chamber to a predetermined positive pressure of gas;
opening up said reference chamber to said plastic bottle so as to form a composite volume of said plastic bottle and said reference chamber;
sealingly connecting a pressure sensor to said composite volume of said plastic bottle and said reference chamber; and
measuring by said pressure sensor a pressure resulting in said composite volume as a measure of said volume of said plastic bottle.

32. The method according to claim 31 further comprising the step of:
determining whether said measured volume of said plastic bottle corresponds with a rated volume for said plastic bottle.

33. Apparatus for in line testing of plastic bottles in production lines, comprising:
a reference chamber of a predetermined volume;
means for sealingly connecting said reference chamber to an interior of a plastic bottle to be tested;
valve means disposed between said reference chamber and said plastic bottle for closing off said reference chamber to permit said reference chamber to be loaded to a predetermined positive pressure of gas and for opening up said reference chamber, after said reference chamber is loaded, to said plastic bottle so as to form a composite volume with said plastic bottle and said reference chamber; and
a pressure sensor sealingly connected to said composite volume formed by said plastic bottle and said reference chamber for measuring a pressure resulting within said composite volume as a measure of a volume of said plastic bottle.

34. The apparatus according to claim 33, further comprising:
means for determining whether said measured volume of said plastic bottle corresponds to a rated volume for said plastic bottle.

* * * * *